(12) United States Patent
Ybarra

(10) Patent No.: US 11,365,098 B2
(45) Date of Patent: Jun. 21, 2022

(54) GRAPPLE CARRIAGE

(71) Applicant: Patrick Ybarra, Coos Bay, OR (US)

(72) Inventor: Patrick Ybarra, Coos Bay, OR (US)

(73) Assignee: Patrick Ybarra, Coos Bay, OR (US)

( * ) Notice: Subject to any disclaimer, the term of this patent is extended or adjusted under 35 U.S.C. 154(b) by 303 days.

(21) Appl. No.: 16/547,135

(22) Filed: Aug. 21, 2019

(65) Prior Publication Data

US 2020/0071135 A1 Mar. 5, 2020

Related U.S. Application Data

(60) Provisional application No. 62/727,404, filed on Sep. 5, 2018.

(51) Int. Cl.

| B66C 21/02 | (2006.01) |
|---|---|
| A01G 23/00 | (2006.01) |
| B66C 3/16 | (2006.01) |
| B61B 12/02 | (2006.01) |
| B66C 1/58 | (2006.01) |
| B61B 7/04 | (2006.01) |

(52) U.S. Cl.
CPC .............. B66C 21/02 (2013.01); B61B 7/04 (2013.01); B61B 12/02 (2013.01); B66C 1/585 (2013.01); B66C 3/16 (2013.01); *A01G 23/003* (2013.01); *B66C 2700/011* (2013.01)

(58) Field of Classification Search
CPC ......... B66C 1/585; B66C 21/00; B66C 21/02; B66C 3/16; B66C 2700/011; A01G 23/003; B61B 7/04; B61B 12/02
See application file for complete search history.

(56) References Cited

U.S. PATENT DOCUMENTS

| 3,079,008 A * | 2/1963 | Naud | ................... B66C 21/00 |
|---|---|---|---|
| | | | 212/94 |
| 3,336,878 A * | 8/1967 | Malakhoff | .............. B66C 21/00 |
| | | | 104/114 |

(Continued)

FOREIGN PATENT DOCUMENTS

| KR | 10-1471841 | 12/2014 |
|---|---|---|
| WO | 2012/164464 | 12/2012 |

*Primary Examiner* — Sang K Kim
*Assistant Examiner* — Nathaniel L Adams
(74) *Attorney, Agent, or Firm* — Schwabe, Williamson & Wyatt, P.C.

(57) ABSTRACT

A skyline log conveying system having a skyline for extending between two elevated supports, one at or above a landing at which logs are deposited and another at a lower position at least as low as an area from which logs are to be moved. A carriage is rollably mounted to the skyline. A grapple is suspended from the carriage, the grapple having closed and opened positions for grasping and releasing logs. A hydraulic pump is mounted to the carriage. A rotatable member is driven by the skyline with the rolling of the carriage on the skyline for driving the hydraulic pump to generate hydraulic pressure. At least one accumulator is in hydraulic communication with the hydraulic pump, the at least one accumulator capable of storing pressure when hydraulic pressure is transmitted to it by the hydraulic pump. A hydraulic ram is hydraulically interconnected with the at least one accumulator and mounted to the grapple to selectively close the grapple to facilitate the grasping of logs.

13 Claims, 5 Drawing Sheets

(56) References Cited

U.S. PATENT DOCUMENTS

| | | |
|---|---|---|
| 3,540,770 A | 11/1970 | Mitchell |
| 3,881,263 A | 5/1975 | Coeurderoy |
| 4,238,038 A * | 12/1980 | Fikse .................. B66C 21/00 |
| | | 212/89 |
| 4,387,812 A | 6/1983 | Biller et al. |
| 4,398,640 A | 8/1983 | Hunter |
| 4,440,305 A | 4/1984 | Biller et al. |
| 4,453,642 A | 6/1984 | Myhre |
| 4,500,004 A | 2/1985 | Peters et al. |
| 4,515,281 A | 5/1985 | Maki |
| 4,629,079 A | 12/1986 | Peters et al. |
| 4,735,327 A | 4/1988 | Biller et al. |
| 5,097,972 A | 6/1992 | Chaen et al. |
| 5,125,707 A | 6/1992 | Chaen et al. |
| 5,653,350 A | 8/1997 | Maki |
| 6,145,679 A | 11/2000 | Walters |
| 6,168,062 B1 | 1/2001 | Varner et al. |
| 7,213,714 B2 | 5/2007 | Baker |
| 7,234,605 B1 | 6/2007 | Torgerson |
| 7,246,712 B2 | 7/2007 | Baker |
| 7,410,067 B2 | 8/2008 | Baker |
| 9,145,281 B1 | 9/2015 | Hunter et al. |

* cited by examiner

GRAPPLE CARRIAGE

The present application claims priority to U.S. Provisional Application No. 62/727,404, which was filed on Sep. 5, 2018, and entitled "GRAPPLE CARRIAGE" and which is hereby incorporated by reference.

TECHNICAL FIELD

Embodiments relate to grapple carriages used for skyline logging operations, typically on steep terrain.

BACKGROUND

Logging operations traditionally have focused on removing the maximum amount of timber from a logging site as inexpensively and as efficiently as possible. However, in recent years such operations have also attempted to perform these operations while minimizing destruction to other trees that may not be a part of the harvest, and to reduce damage to the surrounding soils and nearby streams. It has also become a focus of such operations to minimize the personnel used, not only from a labor cost issue, but more importantly to reduce the possibility of injury to workers engaged in logging operations under the skyline.

For example, it used to be that workers on the ground would have to tie up trees for removal operations using steel cables known as chokers. Such operations now typically use grapples to grasp the logs, and carriages are suspended from a skyline to carry away the logs. More specifically, when harvesting logs on steep slopes or hauling logs over longer distances, a cable yarding system is often employed. In such systems a skyline is extended between two vertical supports called "spars." The spars may be in the form of tall tree trunks but more often are in the form of yarders mounted to vehicles, with wire guylines to stabilize the yarder. A carriage suspended from the skyline hauls logs to a landing position near one of the spars. The ideal landing is a generally level area, situated near a logging road, where logs are de-limbed and loaded onto log trucks.

Typically, a second cable, called a "skidline" or "mainline," extends from the uphill spar to the carriage. The skidline is reeled in to pull the carriage uphill, and paid out as the carriage is permitted to roll down the skyline to pick up more logs. The skyline system may include additional lines, such as to control the opening and closing of the grapple, but the addition of such lines requires additional drums on the yarder for controlling the lines. The inclusion of additional drums increases the weight and cost of the yarder, and requires greater skill on the part of workers.

It is therefore desirable to use two-line systems in which there is only a skyline and a skidline. One such system is disclosed in U.S. Pat. No. 3,540,770 to Mitchell. This patent uses a skyline and a skidline for moving the carriage up and down between the logging site and the landing, and eliminates the requirement of an internal combustion engine. However, Mitchell's system requires an additional line inside the carriage to directly control the opening and closing of the grapple, thus, again, increasing the cost and complexity of the system.

In response to this problem, skyline logging systems have been developed that not only eliminate the need for an internal combustion engine, but also do away with the requirement of a third line for controlling the opening and closing of the grapple. One such system is disclosed in U.S. Pat. No. 7,246,712 to Baker. This system uses only skyline and skidlines. The carriage rides on the skyline from which the grapple is suspended. In addition to controlling the movement of the carriage up and down the skyline, the skidline directly controls the opening and closing of the grapple. One or more brakes or clamps in the carriage are remotely controlled to direct the movement of the carriage on the skyline and to clamp the skyline and/or the skidline. Such systems may also be in use by Alpine Logging and Eagle Carriage and Machine.

The advantage of this system is that it not only eliminates the need for an internal combustion engine but operates with only two drums since it is a two-cable system. The drawback with the system is that there are delays in operating the grapple using the skyline and skidline and the clamp system. For example, if the log load shifts during conveyance up a hill, the skyline and skidline may have to be stopped and the grapple reset to account for a change in diameter of the load. These types of delays not only renders operations more time consuming but can result in danger to the workers on the ground if problems with the grasp on a load of logs cannot be immediately addressed.

Another issue that has arisen with prior art skyline systems is the need for electrical power. This is addressed in some of the larger systems by providing an internal combustion engine and electrical generator. However, as noted above, engines dramatically add to the expense and the size required of a carriage in order to support a substantial engine. Other systems incorporate rechargeable batteries, but battery systems require recharging and may not provide sufficient power.

As a result of these needs, systems have been developed to generate power during skyline operations. For example, an alternators has been mounted in the carriage that can turn and thereby generate power as the carriage is riding downslope to engage another load. However, such systems do not provide sufficient power to drive the grapple or to control its vertical movement to pick up and raise a load of logs.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
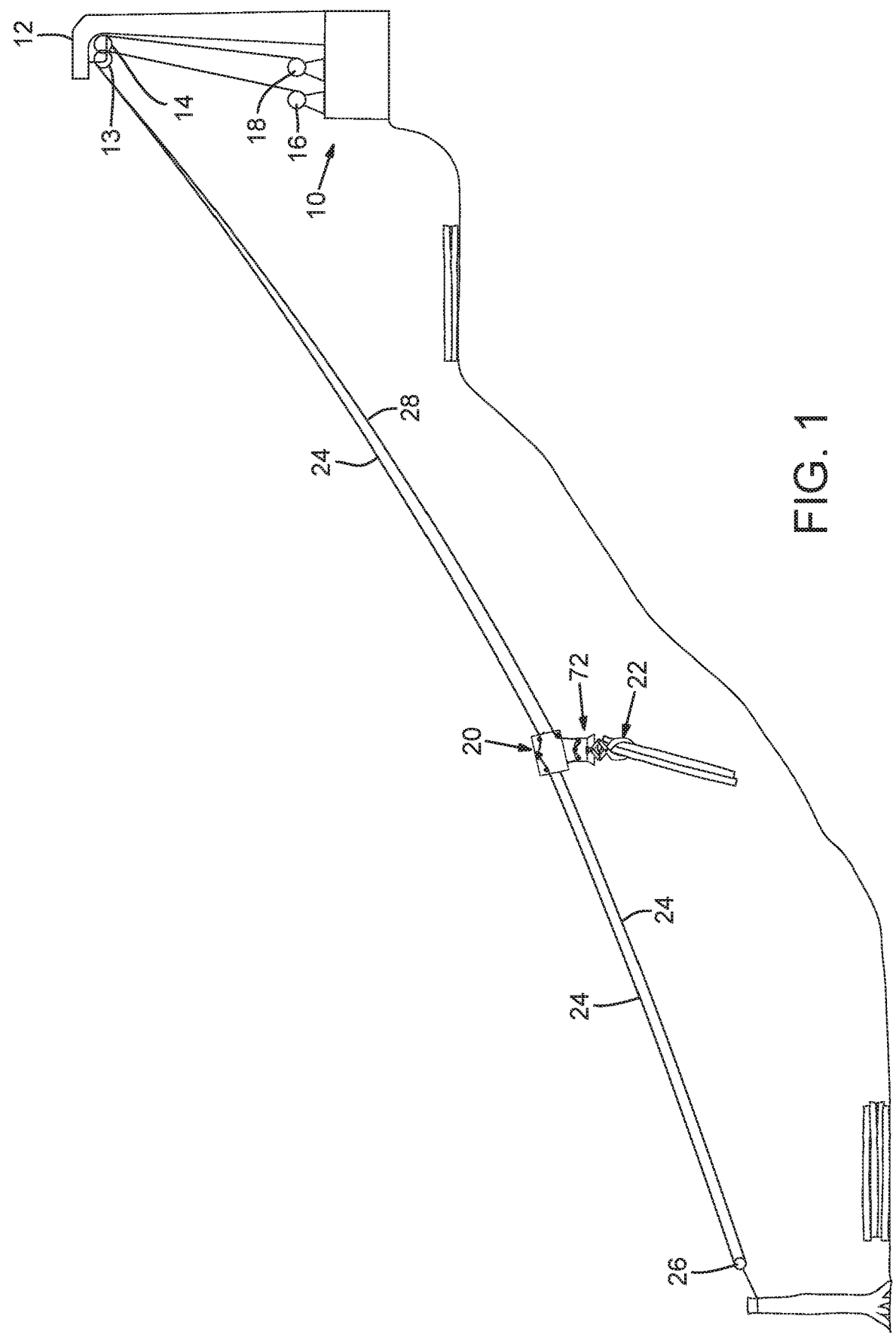
FIG. 1 is a side elevation, schematic view of a skyline logging operation using a first embodiment of the present disclosure.
Figure 2:
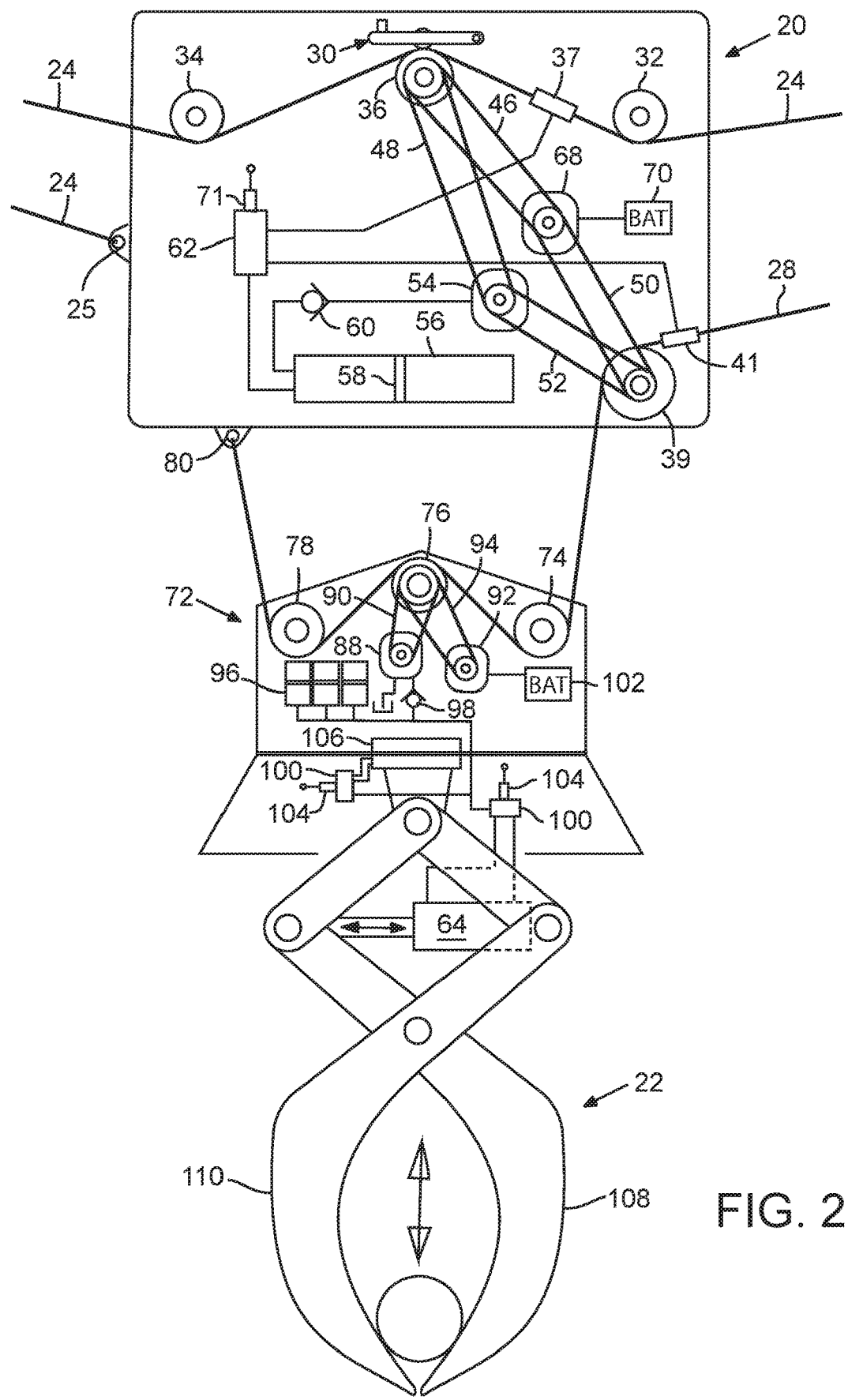
FIG. 2 is a side elevation view of the first embodiment with the interior areas of a carriage and grapple housing exposed.
Figure 3:
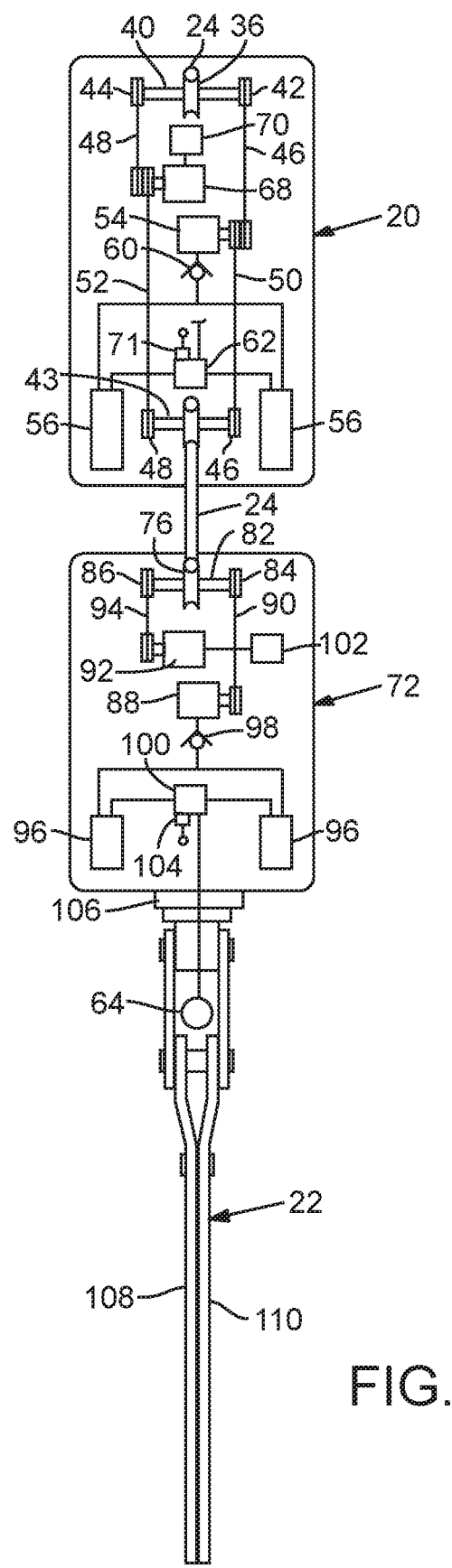
FIG. 3 is an end elevation view taken along line 3-3 of FIG. 2.

The Embodiment of FIGS. 1-3

FIG. 1 shows a typical skyline yarding set up. It includes a two-drum yarder 10, which may include a tower 12 that may be mounted to a vehicle (not shown), with first and second pulleys 13 and 14, and first and second winches 16 and 18. The depicted system carries logs from a lower position to a higher position but that may be reversed in certain situations. With the described system, the direction of hauling makes no difference, as power is being generated in both directions, as will be understood as this description continues.

As depicted, a carriage 20 with a grapple housing 72 and a grapple 22 suspended below it rides up and down a skyline 24. The skyline extends from first winch 16, over first pulley 13, and is fastened at 25 to carriage 20 after passing through a haulback block 26. Skyline 24 supports carriage 20 via a pair of rollers 32 and 34 that are rotatably mounted to the carriage, adjacent the upper corners thereof. Between rollers 32 and 34, skyline 24 passes through a skyline clamp 37 and over a central power generation sheave 36. Clamp 37 stops the skyline at appropriate times during the logging cycle, as will be explained further as this discussion continues. The clamp is typically remotely controlled, and may be either hydraulically or electrically operated.

Figure 4:
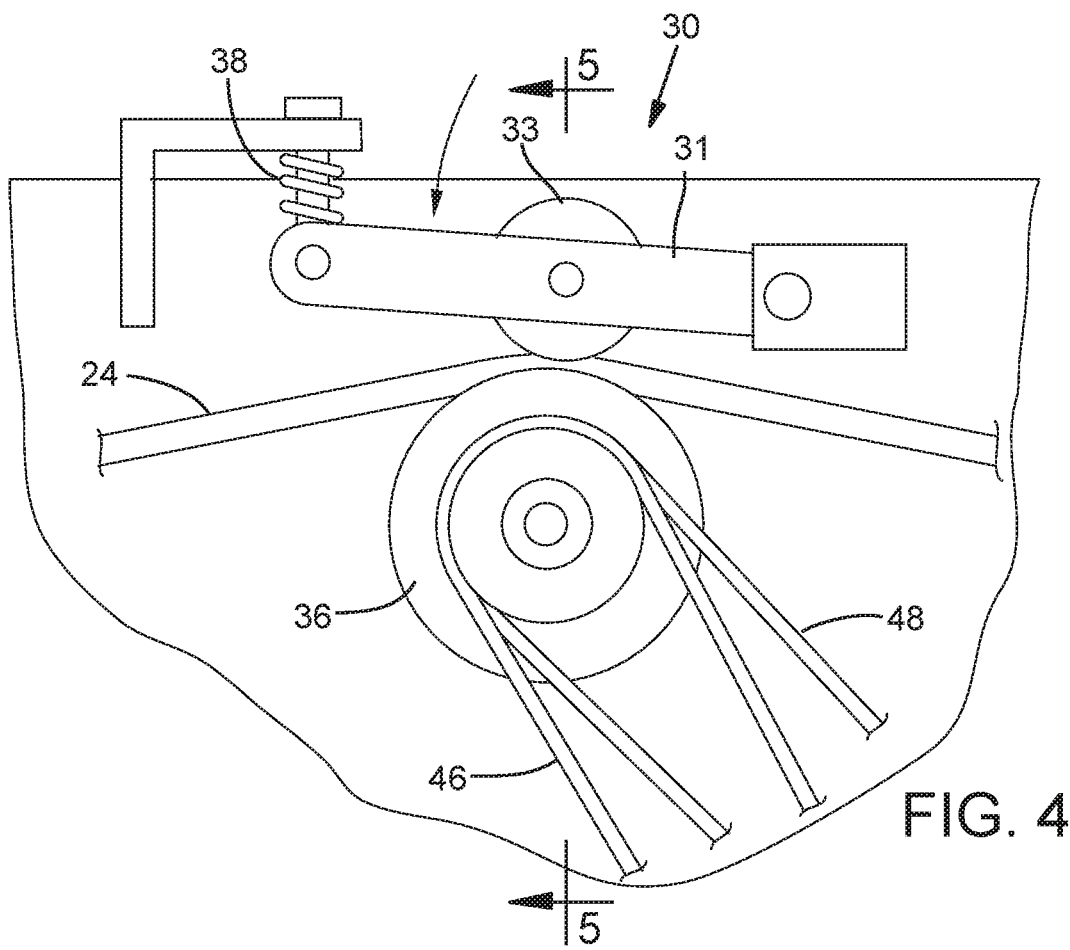
FIG. 4 is a side elevation fragmentary view of a tensioning device that may be used with either the first or second embodiments, showing the tensioning device pressing the skyline against a central power generation sheave.
Figure 5:
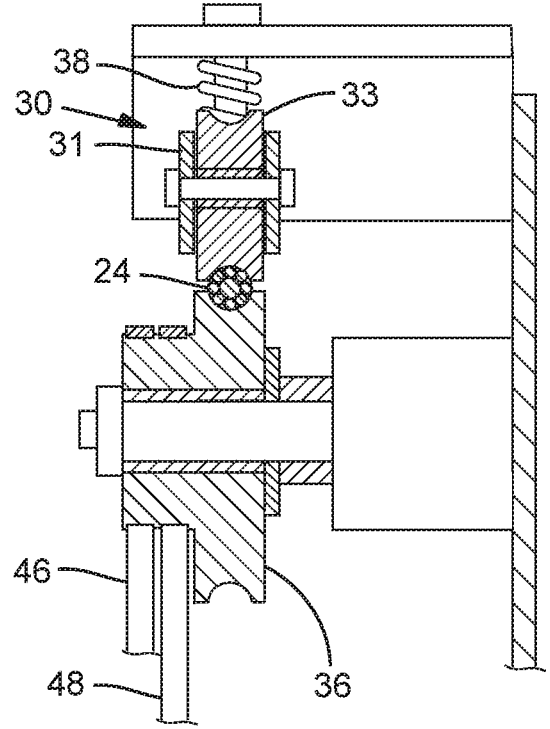
FIG. 5 is a sectional, end elevation view of the tensioning device, taken along line 5-5 of FIG. 4.

A tensioning device 30, not shown in FIGS. 1-3 but depicted in FIGS. 4 and 5, with a tensioning spring 38, may be mounted adjacent central power generation sheave 36 to ensure that skyline 24 exerts sufficient downward pressure on central power generation sheave 36 such that the skyline is rotating the sheave. The depicted tensioning device 30 is pivotally mounted to the carriage at a first end 31, and includes a pressure roller 33 so that skyline 24 passes between the pressure roller and central power generation sheave 36, with the tension of spring 38 holding the skyline against the sheave.

A skidline 28 extends from second winch 18, over second pulley 14, and enters carriage 20 at a lower corner, where it passes over a lower power generation sheave 39 before being directed downwardly toward the grapple housing 72 (which may also be referred to as a grapple carriage. Skidline 28 and second winch 18 cooperate with skyline 24 and first winch 16 to permit the skyline and the first winch to pull the carriage 20 up the hill. Then, when the carriage 20 is to return down the hill, the winches cooperate to permit skidline and second winch to pull the carriage 20 down the hill. In certain applications, such as where the hill is very steep, pulling may not be necessary and the carriage 20 may merely be allowed to roll down the skyline. But even in those instances, the winches must cooperate so excess slack does not develop in the lines.

As skidline 28 enters carriage 20, it extends through a skidline clamp 41 that is mounted to the carriage. Skidline clamp 41 is typically remotely controlled and may be either hydraulically or electrically operated. The function of skidline clamp 41 will be explained below.

Each of the central power generation sheave 36 and the lower power generation sheave 39 are designed to drive a hydraulic pump 54 and an alternator 68 to provide both hydraulic power and electricity to the carriage. By providing that capability in the carriage itself, the carriage does not need to include an internal combustion engine, which is commonly included in carriages and which by necessity drives up the weight and the cost of the system.

Specifically, as shown in FIGS. 2 and 3, central power generation sheave 36 is mounted to a central power generation shaft 40, which has central power generation shaft sprockets 42 and 44 adjacent each end. These two sprockets 42 and 44 drive a hydraulic pump chain 46 and an alternator chain 48, respectively. Lower power generation sheave 39 is mounted to a lower power generation shaft 43, and includes lower power generation shaft sprockets 46 and 48 adjacent each end. Another hydraulic pump chain 50 and alternator chain 52 are driven by lower power generation shaft sprockets 46 and 48, respectively.

A bi-directional hydraulic pump 54, driven by hydraulic pump chains 46 and 50, provides hydraulic pressure to at least one accumulator 56. In the depicted embodiment, two such accumulators 56 are shown because having a plurality of accumulators will ensure that there is enough hydraulic pressure to control the operation of clamps 37 and 41 and to perform any other operations that are needed in the carriage. In certain applications it may be appropriate to include three or more accumulators.

A conventional clutch or other apparatus may be used between the chains and hydraulic pump 54 because the central and lower power generation sheaves 36 and 39, respectively, often will not be rotating to drive hydraulic pump 54 at the same time or at the same speed. Specifically, as carriage 20 is moving up and down skyline 24, central power generation sheave 36 will be driving the hydraulic pump. As will be explained more fully below, lower power generation sheave 39 will be driving the hydraulic pump as grapple 22 is being raised and lowered. During this raising and lowering process the carriage is usually stationary on the skyline. The clutch arrangement accommodates for this. It also provides for the situation where the grapple is being raised or lowered while the carriage is moving up or down the skyline. In this situation the sheave that is rotating more quickly will drive the hydraulic pump.

The fact that the hydraulic pump is bi-directional means that the pump generates hydraulic pressure as carriage 20 travels both up and down the skyline. This permits the pump and the accumulators to be smaller than they otherwise would have to be if power was generated in only one direction. Or, if they are the same size, this bi-directional operation permits the generation of twice the hydraulic pressure. Either way, the system is preferable to one that operates in only one direction.

Each accumulator 56 may have one end charged with nitrogen, and the other end in hydraulic connection with hydraulic pump 54, with a moveable piston 58 disposed therebetween. When the hydraulic pump provides hydraulic fluid pressure to the accumulators, the nitrogen is compressed by piston 58 moving to the right in the figures to store the energy in the form of pressure exerted from the compressed nitrogen. A check valve 60 is typically provided between hydraulic pump 54 and accumulator(s) 56 to prevent fluid pressure from leaking back toward the pump. When hydraulic pressure is needed to open or close clamps 37 or 41, or to perform other functions in carriage 20, a radio-controlled accumulator valve 62 disposed downstream of the accumulators is opened, sending hydraulic pressure to either or both of the clamps or wherever else it is needed in the carriage.

As noted earlier, sprocket 44 mounted to central power generation sheave 36 and sprocket 48 mounted to lower power generation sheave 39 drive alternator chains 48 and 52 to drive a bi-directional alternator 68. Again, a conventional clutch or other apparatus may be included to make sure that alternator 68 is driven by the faster of the two chains. Alternator 68 can provide electrical power to clamps 37 or 41 via a battery 70 if they are to be electrically driven or wherever else it is needed in carriage 20, such as for radio control, lighting, alarms, indicators and other controls.

Battery 70 is typically included to make electricity available in the carriage at times that the sheaves are not driving the alternator. Incorporation of a bi-directional alternator, as with the bi-directional hydraulic pump, enables the alternator to be charged both while carriage 20 is being pulled up the skyline 24 and when it is moving down. This doubles the amount of electrical power generated or enables the alternator to have half of the capability it otherwise would have to have. In either event, the system benefits from the bi-directional capability.

With the hydraulic pump and alternator generating hydraulic and electric power as the carriage moves up and down the skyline, there does not need to be independent power source such as an internal combustion engine mounted in the carriage. This is a real advantage and enables the cost of the system to be far less expensive. It may be that in some systems, the dual system of a hydraulic pump or an alternator is not necessary or desirable, but the depicted embodiment includes both systems in order to provide maximum flexibility.

As mentioned above, the entire system is preferably remotely controlled. Typically tower 10 will be mounted to a vehicle in which an operator controls not only winches 16 and 18, but also clamps 37 and 41, accumulator valve 62, as well as anything else that needs to be controlled in carriage 20 and grapple housing 72. The radio control in the carriage is schematically indicated at 71. The operator normally operates using remote cameras that monitor the loading and unloading of the logs and so the operator can watch on a monitor, typically at his vehicle (not shown), as the load is being carried up the hill and the carriage is returning to pick up another load. This is preferably all done without workers under the load as it is being pulled up the hill.

As mentioned above and as shown best in FIG. 2, skidline 28 passes from second winch 18 to carriage 20, through skidline clamp 41 and over lower power generation sheave 39. It then is directed downwardly toward grapple housing 72 disposed below the carriage 20. As noted above, grapple housing 72 is, in the depicted embodiment, disposed immediately below carriage 20 and above grapple 22, with the grapple 22 being mounted to the bottom of the grapple housing 72. Skidline 28 enters grapple housing 72 and, similar to skyline in carriage 20, is directed across a roller 74, a grapple housing central power generation sheave 76, and another roller 78. Skidline 28 is then directed upwardly to carriage 20, where it is mounted to a lower portion at 80. As shown in FIG. 3, grapple housing power generation sheave 76 includes a shaft 82 and a pair of sprockets 84 and 86.

The components in grapple housing 72 are similar to those in carriage 20 in that the grapple housing central power generation sheave 76 has the capability of providing both hydraulic and electrical power to the components in the housing. As with carriage 20, it may be that in some applications, either the hydraulic or electrical components may be deleted so that the components would be either hydraulically or electrically driven. However, normally an alternator should be included in either the carriage or the grapple housing in order to power the radio control so the operator can remotely control the operation of the system.

The principal difference between the components in carriage 20 and grapple housing 72 is that there is no lower power generation sheave in the grapple housing. Therefore, grapple housing central power generation sheave 76 alone drives a hydraulic pump 88 via a hydraulic pump drive chain 90 and an alternator 92 via an alternator drive chain 94. Like carriage 20, grapple housing 72 includes at least one accumulator 96 (here, six accumulators are shown in FIG. 2 and two are shown in FIG. 3), which is provided with hydraulic pressure from hydraulic pump 88. A check valve 98 is disposed between the hydraulic pump and the one or more accumulators, and a radio-controlled accumulator valve 100 is positioned downstream of the accumulators.

A battery 102 is provided to store electricity generated by alternator 92, and a radio control 104 is included to facilitate remote control of the accumulator valve 100, which controls the hydraulic pressure that can control the position of the grapple 22. Given that there may be both electrical and hydraulic power in grapple housing 72, the position of the grapple 22 may be either electrically operated via motors or hydraulically operated. However, the grapple 22 is normally hydraulically operated by both a grapple rotation system 106 and a grapple ram 64, which controls the position of a pair of jaws 108 and 110 making up the grapple 22. Rotation system 106 is disposed immediately above grapple 22 and is designed to provide up to 360 degrees of rotation capability, either in two directions or one. While rotation system 106 may be electrically-driven, it is normally driven with hydraulic power from hydraulic pump 88 via accumulator(s) 96 and remotely controlled accumulator valve 100.

Grapple ram 64 is a two-way hydraulic cylinder, with an adjacent valve (not shown) for shifting the hydraulic power from one side of the piston (also not shown) to the other. This will determine whether ram 64 is being extended to close the grapple jaws or retracted to open the jaws.

Operation of the Embodiment of FIGS. 1-4

With carriage 20 and grapple housing 72 in a lower position disposed above the logs to be conveyed to the upper landing, grapple 22 may need to be rotated by grapple turning system 106. In that event, hydraulic pressure is sent from housing accumulators 96 by the operation of radio control 104 sending a signal to accumulator valve 100 to open the valve and send pressure to grapple turning system 106 to rotate the grapple. The operator can select the direction of rotation by remote control.

Once grapple 22 is in the proper rotational position and the grapple jaws are in an open position, the grapple is lowered to pick up the logs. This is done by remotely closing skyline clamp 37 on skyline 24 by sending hydraulic pressure to the clamp via accumulator valve 62. This prevents carriage 20 from moving on skyline 24. At the same time, hydraulic pressure is sent to open skidline clamp 41 to permit skidline 28 to slide through the clamp. Because the end of skidline 28 is fixed to carriage 20 at 80, when second winch 18 lets the skidline out, this will cause grapple housing 72 and grapple 22 to drop down to engage the logs as the skidline slides along rollers 74 and 78 and grapple housing central power generation sheave 76. Because skidline 28 is rotating lower power generation sheave 39 in carriage 20, both hydraulic pressure and electrical power are being generated during the grapple lowering operation.

Once grapple jaws 108 and 110 are in position to engage the logs, accumulator valve 100 is opened to send hydraulic pressure to grapple ram 64 to retract the ram and close jaws 108 and 110. Once the jaws engage the logs, second winch 18 retracts skidline 28, and grapple housing 72 and grapple 22 are elevated up to the desired height, which may be most of the way up to carriage 20 as shown in FIGS. 1 and 2. Or, grapple 22 may only be slightly elevated if the logs are to be dragged up the hill.

Thus, while power is generated by skidline 28 turning lower power generation sheave 39 and grapple housing central power generation sheave 76, the skidline is not directly controlling the opening and closing of the grapple such as in prior system where the skidline actually extends to and operates the opening and closing of the grapple.

Because hydraulic ram 64 is used to cause grapple 22 to engage the logs, the operation is swift and positive. Moreover, because grapple housing accumulator valve 62 may be maintained in an open position, constant hydraulic pressure is maintained on ram 64 and jaws 108 and 110 as the load is carried up the hill. Thus, in the event the log load shifts and the diameter of the load is reduced, the grapple will close to keep the logs securely held in place.

Once grapple housing 72 and grapple 22 have reached the desired elevation, the operator remotely opens skyline clamp 37 and closes skidline clamp 41 by sending hydraulic power via accumulator valve 62. This will permit carriage 20 to be hauled up the hill by skidline 28 via second winch 18, with skyline 24 and first winch 14 paying out cable. With skidline clamp 41 being closed, the grapple housing and grapple are prevented from being raised or lowered during the hauling operation. If for any reason during the process of conveying the logs to the top of the hill the operator wishes to raise or lower the grapple and its load, this can be done by re-opening skidline clamp 41.

Once the carriage 20 and its load reach the landing area where the logs are to be dropped, the jaws 108 and 110 can simply be opened by extending grapple ram 64. Or, if the grapple 22 is at that point well off the ground, the grapple 22 may be lowered by closing skyline clamp 37 and opening skidline clamp 41. The skidline is then let out by second winch 18, thus lowering the grapple housing 72 and its load to the ground.

Housing accumulator valve 100 is then opened to extend ram 64 to open the jaws and release the load. Because the grapple will normally need to be elevated off the ground for its trip back down for the next load, the skidline clamp 41 will be left open so that second winch 18 can retract skidline 28 to raise grapple housing 72 and grapple 22 for the trip back down the skyline.

To move the carriage back down the skyline, skidline clamp 41 is closed and skyline clamp 37 is opened. First winch 16 then retracts skyline 24 while second winch 18 allows skidline 28 to feed out, permitting the carriage to ride down the skyline. As this is happening, hydraulic pressure and electricity are being generated as skyline 24 is rotating central power generation sheave 36. If tensioning device 30 is included in the system, its spring 38 will hold the skyline cable firmly against sheave 36 to make sure the sheave is rotating with the movement of the skyline. Once the carriage reaches the loading area, the process begins again.

Figure 6:
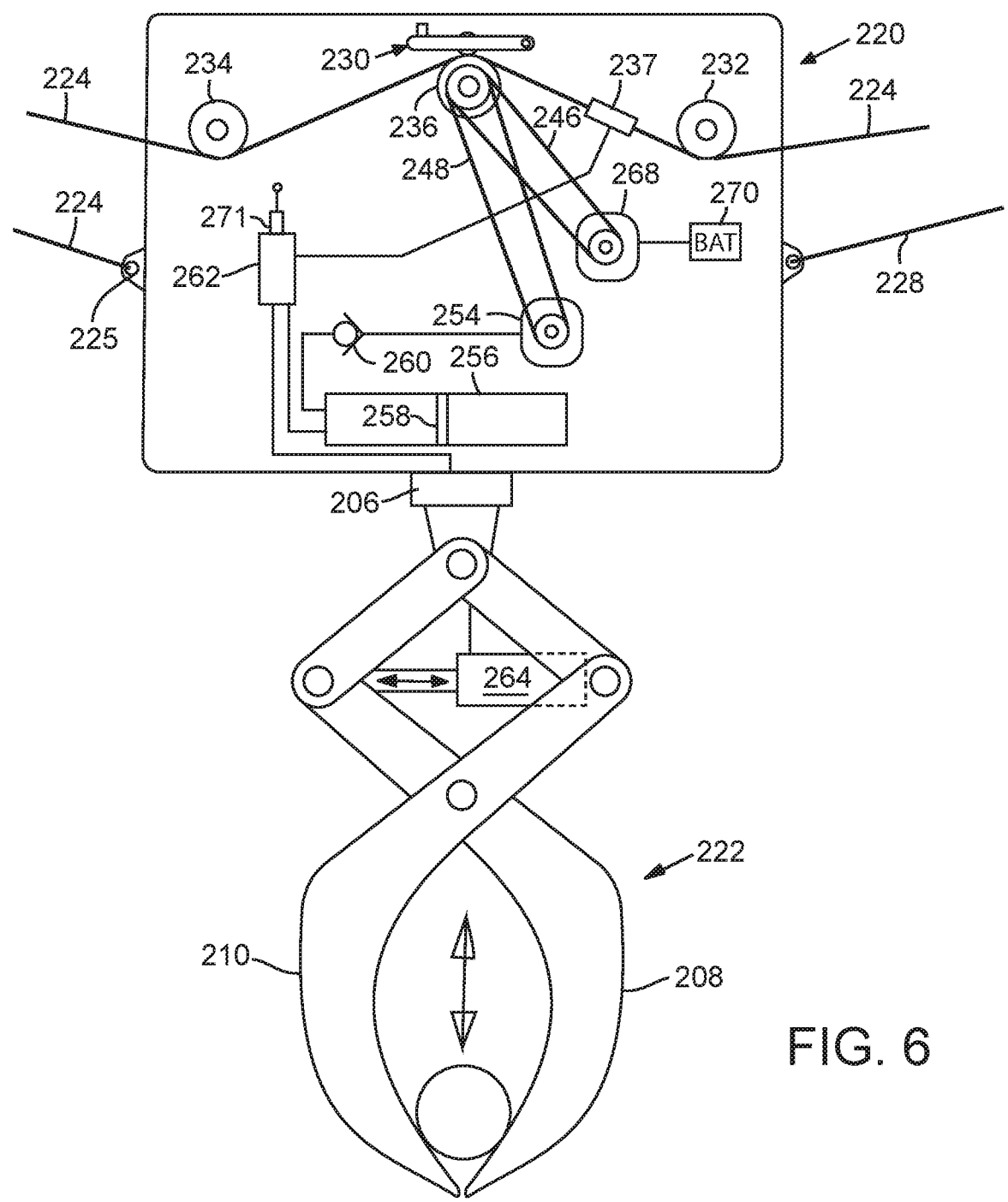
FIG. 6 is a side elevation view of a second embodiment of the disclosure with the interior areas of the carriage exposed.

The Embodiment of FIG. 6

The embodiment of FIG. 6 is similar to that of FIGS. 1-5 but the system is simplified in that the functions of the carriage and the grapple housing are combined into a single carriage. As the components as so similar, corresponding reference numerals will be used to identify the parts in the embodiment of FIG. 6, except that they will be in the 200 series.

Therefore, the carriage is identified at 220, the grapple at 222, the skyline at 224, the skidline at 28, the rollers at 232 and 234, the central power generation sheave at 236 and the skyline clamp at 237. There is no lower power generation sheave or skidline clamp. The tensioning device 30 of FIGS. 4 and 5 with tensioning spring 38 may be included in this embodiment.

Like the first embodiment, central power generation sheave 236 includes a shaft with a pair of sprockets, which a hydraulic pump chain 246 and an alternator chain 248, a bi-directional hydraulic pump 254 and a bi-directional alternator 268. At least one accumulator 256 receives hydraulic pressure from hydraulic pump 254, and includes a check valve 260. A battery 270 receives electricity from alternator 268.

The grapple 222 is mounted directly to the underside of carriage 220. A grapple turning system is at 206 and grapple jaws are at 208 and 210, controlled by a two-way grapple ram 264 The structure and operation of ram 264 is typically the same as grapple ram 64 described above.

A similar remote control capability may be provided so that a single operator may control the operation of the system from a station having a monitor with video capability. The radio control is schematically shown at 271.

Operation of the Embodiment of FIG. 6

When carriage 220 is positioned over the load of logs, skyline clamp 237 is maintained in its open position and skyline 224 and skidline 228 are slackened by their respective winches to lower grapple 22 to a point close to the logs. Grapple 220 is remotely rotated by hydraulic pressure from accumulators 256 passing through open accumulator valve 262 to grapple turning system 206. Once the grapple is in the appropriate rotational disposition and the skyline and skidline are further slackened if necessary, hydraulic pressure is sent from accumulators 256 and open accumulator valve 262 to hydraulic grapple ram 264 to retract the ram. This closes grapple jaws 208 and 210 on the load. The slack is then taken out of skyline and skidline, and skidline 228 is retracted while skyline 224 is extended by their respective winches so that carriage 220 is drawn up the hill.

Once the carriage reaches the landing where the logs are to be dropped, the lines are again slackened until the logs are either resting on the ground or are close to it. The position of ram 264 is then remotely shifted so that hydraulic pressure causes the ram to extend, opening jaws 208 and 210 to drop the load. The winches then again take the slack out of skyline 224 and skidline 228 to elevate carriage 220. The winches retract and extend the skyline and skidline, respectively, to take the carriage down the hill to pick up the next load. The process is then repeated.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A skyline log conveying system comprising:
    a skyline for extending between two elevated supports, one at or above a landing at which logs are deposited and another at a lower position at least as low as an area from which logs are to be moved;
    a carriage rollably mounted to the skyline;
    a skidline;
    a grapple housing suspended from the carriage;
    a grapple extending from the grapple housing and having closed and opened positions for grasping and releasing logs;
    a first hydraulic pump mounted to the carriage;
    a rotatable member driven by the skyline with the rolling of the carriage on the skyline for driving the first hydraulic pump to generate hydraulic pressure;
    at least one accumulator in hydraulic communication with the first hydraulic pump, the at least one accumulator capable of storing pressure when hydraulic pressure is transmitted to it by the first hydraulic pump; and
    a hydraulic ram hydraulically interconnected with the at least one accumulator and mounted to the grapple to selectively close the grapple to facilitate the grasping of logs,
    wherein the grapple housing includes at least one of a second hydraulic pump driven by the skidline and alternator driven by the skidline.

2. The skyline log conveying system of claim 1 wherein the hydraulic ram comprises a two-way hydraulic cylinder mounted to the grapple to selectively open as well as close the grapple to facilitate the grasping and releasing of logs.

3. The skyline log conveying system of claim 1, further comprising an alternator coupled to the carriage and having a rotatable member driven with the rolling of the carriage for generating electricity, and a battery for storing electricity generated by the alternator that is coupled to the carriage and to provide power when needed by the system.

4. The skyline log conveying system of claim 1, wherein neither the skyline nor the skidline directly controls the opening and closing of the grapple.

5. The skyline log conveying system of claim 1, wherein the first hydraulic pump generates hydraulic pressure while the carriage rolls both up and down the skyline.

6. The skyline log conveying system of claim 1, wherein the position of the grapple housing being is controlled by the skidline.

7. The skyline log conveying system of claim 6 wherein the vertical disposition of the grapple housing is controlled by the skidline.

8. The skyline log conveying system of claim 7 wherein the carriage further includes a rotatable member that is driven by the skidline as the skidline is changing the vertical disposition of the grapple housing.

9. The combination of a carriage and grapple for picking up and transporting logs along a path of a skyline, comprising:
    a plurality of carriage rollers for rotatably mounting the carriage to the skyline;
    a first hydraulic pump including a first rotatable member that rotates to generate hydraulic pressure as the carriage rolls along the skyline;
    at least one accumulator hydraulically connected to the first hydraulic pump to receive hydraulic pressure and store that pressure;
    a first alternator including a second rotatable member that rotates to generate electricity as the carriage rolls along the skyline;
    a battery electrically connected to the first alternator to store electricity generated by the first alternator;
    a grapple that can be closed and opened to grasp and release at least one log;
    a hydraulic ram mounted to selectively open and close the grapple, the hydraulic ram being hydraulically connected to the at least one accumulator or being electrically connected to the battery, and
    a third rotatable member that is rotated by a skidline as the skidline operates to raises and lower the grapple, wherein the third rotatable member drives a second hydraulic pump or a second alternator or both.

10. A method of operating a logging system, not necessarily in the order recited, comprising:
    providing a yarder comprising a first winch and a second winch positioned near a landing;
    attaching a skyline to the yarder at a first end and to a securing support at a second end;
    providing a carriage for rolling on the skyline;
    providing a grapple suspended below the carriage, the grapple being adjustable between open and closed positions by the operation of a hydraulic grapple ram;
    providing a hydraulic pump in the carriage for generating hydraulic pressure;

providing a skidline connected to the second winch at a first end and to the carriage at a second end, wherein the skidline is directed through the carriage and provides power for the hydraulic pump as it passes through the carriage;

providing at least one accumulator hydraulically interconnected with the hydraulic pump to receive and store hydraulic pressure from the hydraulic pump;

providing a grapple position control ram hydraulically interconnected with the at least one accumulator to selectively close the grapple to grasp one or more logs;

providing a grapple position control valve disposed between the at least one accumulator and the grapple position control ram; and when the grapple is positioned over one or more logs to be picked up, opening the grapple position control valve to send hydraulic pressure to the grapple position control ram to close the grapple on the one or more logs.

11. The method of claim 10, further comprising a grapple housing disposed between the carriage and the grapple wherein the skidline generates hydraulic power in the grapple housing to provide hydraulic power to the grapple position control ram.

12. The method of claim 11 wherein the skidline controls the vertical position of the grapple housing but not the opening and closing of the grapple.

13. The method of claim 12, further comprising:
providing a skidline clamp that may be closed and opened to fix the vertical position of the grapple or to release the grapple to permit it to be raised and lowered, respectively, by the skidline.

* * * * *